United States Patent [19]

Stock et al.

[11] 3,960,187

[45] June 1, 1976

[54] METHOD AND DEVICE FOR METERING AND DISPERSING FLUID MATERIALS

[75] Inventors: Heinz Stock, Oberursel, Germany; Hans W. Rebentisch, deceased, late of Frankfurt, Germany, by Waltraud Rebentisch, heir at law

[73] Assignee: USM Corporation, Boston, Mass.

[22] Filed: July 9, 1975

[21] Appl. No.: 594,573

[30] Foreign Application Priority Data

July 23, 1974 Germany............................ 2435431
July 23, 1974 Germany............................ 2435410

[52] U.S. Cl................................. 141/1 R; 141/67; 222/373
[51] Int. Cl.² ......................................... B65B 3/26
[58] Field of Search.................. 222/420, 193, 373; 417/109, 118, 503; 141/67, 1, 129

[56] References Cited
UNITED STATES PATENTS

| | | | |
|---|---|---|---|
| 1,343,693 | 6/1920 | Thomas | 417/109 |
| 3,179,134 | 4/1965 | Sigrist | 141/67 |
| 3,731,850 | 5/1973 | Wietzel et al. | 222/420 X |

FOREIGN PATENTS OR APPLICATIONS

| | | | |
|---|---|---|---|
| 1,024,881 | 2/1958 | Germany | 141/67 |

Primary Examiner—Allen N. Knowles
Assistant Examiner—Hadd Lane
Attorney, Agent, or Firm—Benjamin C. Pollard; Vincent A. White; Richard B. Megley

[57] ABSTRACT

Method and device for metering and dispensing viscous or partly fluid materials in which the fluid material is flowed downwardly as a column through a tube, is separated into portions by injecting gas into the column to form bubbles spaced along the length of the fluid column and discharging the separated portions from an outlet opening of the tube. The apparatus includes a tube together with a controlled fluid material supply, a gas supply, a gas inlet for generating bubbles to separate fluid passing through the tube into portions and an outlet from the tube for discharging separated portions of fluid. The fluid portions may be collected and maintained separate by deposition in a displaceable medium such as air, liquid or powder, or by separate containers for each portion. The portions deposited in powder may pick up powder in the form of a non-tacky coating.

16 Claims, 5 Drawing Figures

METHOD AND DEVICE FOR METERING AND DISPERSING FLUID MATERIALS

FIELD OF THE INVENTION

This invention is concerned with improvements in or relating to metered dispensing of fluid materials, and is especially concerned with handling viscous or pasty materials.

BACKGROUND OF THE INVENTION

It has been proposed to meter and dispense fluids with the help of a pump, the piston of which sucks up the required quantity of the fluid and then expels this quantity in a subsequent operation. For this, complicated valve systems have been proposed for exact control of the two working-cycles and for ensuring precise metering. However, liquids and thermoplastic melts of high viscosity are not easy to meter in this way, especially those which have a strong tendency to stringiness if one tries to divide them into single small portions. Permanently-tacky melt-adhesives for example are particularly difficult to handle.

By "permanently-tacky melt-adhesives" we mean those adhesives which can be applied in hot, molten form, and which in dry form (free from solvent), at room-temperature and on mere contact, solidly adhere to a number of different surfaces. These adhesives do not require activation by water, solvent or heat in order to give them a strong adhesion to the most widely-differing materials, such as paper, cellophane, glass, wood and metal. When they are applied on a suitable backing-substance, they can be pulled off without resistance from smooth underlays. These materials are thus normally kept and transported in siliconized containers until the moment of processing. Hitherto it has not been possible to granulate them like other hot meltadhesives for storage and transport in drums or sacks.

BRIEF SUMMARY OF THE INVENTION

It is one of the various objects of the present invention to provide an improved method and means for metered dispensing of materials in fluid condition.

The invention provides in one of its aspects a method and device for metering and dispensing fluids which comprises progressing a column of the the fluid through a tube, injecting successive portions of gas seriatim into the flowing fluid to form bubbles spaced along the length of the column so that fluid flows from an outlet opening of the tube as separated portions of desired uniform magnitude. The portions may be collected separately in a conserving medium.

DETAILED DESCRIPTION OF THE INVENTION

According to a preferred feature of the invention the metering and dispensing is achieved by causing the fluid to flow downward in a vertically disposed tube and injecting successive portions of a gas coaxially into the vertically-arranged tube with such pressure that there occurs at the downward pointing tube-outlet, a sudden expansion of the trapped gas-bubbles as the bubbles reach the outlet with an expulsion of the respective portions of liquid at the tube-outlet. By the injection of gas under pressure into the vertically downward pointing tube, there occurs on the entry of the gas into the flow of viscous or pasty liquid a force-effect driving the liquid apart central-symmetrically. In this, the gas extends immediately to the wall of the tube as a central-symmetrical gas-bubble, and thereby effects a separation of a distinct portion or slug of the liquid from the liquid-flow that is following. The vertical, downward pointing arrangement of the tube, and the coaxial injection of the gas, is chosen so as to avoid disruptive effects due to gravity, in the sense of the liquid holding together on one side, as could arise, for example in a horizontal or oblique direction of the tube. Moreover, it appears important that at the outlet of the tube, the gas, under pressure, has a sudden expansion by which the relevant portion or slug of liquid is completely sheared away from the tube-outlet, so that no filaments can form at that point, as is especially the tendency with viscous liquids. With this shearing-away of the relevant portion or slug of liquid, the latter is then transferred into a conserving medium so that the single portions of liquid retain their same quantity and in this form can be further processed.

In a method according to the invention, the conserving medium can be such as prevents the recoalescing of the single portions of liquid, for example, air, water, or a powder. In the particular case of melts, a gas e.g. air, or a liquid e.g. water, can be used for cooling them, according to how quickly the cooling has to take place. Other suitable liquids can of course be used instead of water. With such cooling media one then obtains solid single drops from the melt. One can also use as a conserving medium, however, a container, for example a tube into which a pasty liquid, for example tooth-paste, is filled. In this case the tooth-paste is pushed over the tube-outlet in a known way so that the filling begins at the screw-cap end, the tooth-paste tube being then pushed from the tube-outlet with the progress of the filling until when full, but with its rear end still open, the tooth-paste tube is pushed away from the tube-outlet by the following gas-bubble. In one specially important application one may allow fluid, melted drops of thermoplastic to fall into a powder, so that solidifying drops coat themselves with the powder which then prevents any sticking together of the portions produced in this way. Application of powder to the whole surface of the drop may be achieved for example by dropping the liquid drop into a drum of the powder rotating about an inclined axis, or by dropping the liquid drop into a bed of the powder and applying further powder over the drop whilst it is still hot. In a preferred method hereinafter referred to, heat dissipated during cooling of drops of the melt serves to soften a thermoplastic powder, leading to an encasing of the drop in an intermediate closed coating layer derived from melting and resolidifying the powder, and an outer layer of unmelted powder at least lightly adherent to the coating.

In the case of the use of a method according to the invention for the dividing of melted thermoplastic materials, the gas is injected advantageously in a heated state. In this case, the heated gas has the effect that at the point of contact between gas and melt the latter is not chilled and may even be additionally liquified, whereby on the one hand a better slide-effect is achieved at the edge-zone in relation to the tube, while moreover the formation of filament between the cut-off portion and the following melt-flow may be minimized.

Devices for carrying out a method according to the invention which are hereinafter described to illustrate the invention by way of example, are constructed in such a way that, for the injection of the gas, a nozzle is arranged lying coaxially in the vertically downward pointing tube. The nozzle is connected to a dosing device for controlled supply of successive portions of gas and protrudes into an elbow of the tube with its lower end below the elbow, so that a blast of gas issuing from this nozzle immediately extends coaxially around it to the wall of the tube. In the illustrative devices, the metering of the fluid can be controlled by varying the rate of flow of the fluid and by varying the frequency of delivery of the separating bubbles.

Two of the illustrative devices are intended primarily for use in providing coated particles according to the invention, and one is intended for use in tube-filling.

In the illustrative devices, in order to facilitate the shearing away of the portions at the tube-outlet, the latter is constructed in such a way that it is formed by a sharp inside-edge lying normal to the axis of the tube and provided by a cross-sectional surface lying at a right angle to the axis of the tube.

In the illustrative devices the tube has a zone of reduced diameter adjacent the outlet, and in this zone the speed of flow of the fluid is therefore increased, which likewise facilitates the shearing of the portions at the tube-outlet. The volume within this zone of the tube preferably corresponds with the volume of the portion of fluid to be dispensed.

The illustrative devices may have, as a resistance against the formation of filaments between the portions in the tube, a wetting-resistant surface, for example one provided by a siliconization.

One of the illustrative devices, intended for use with fluids having greater tendency to form "tails" is provided with means for heating the metered portions as they descend from the tube-outlet, this means comprising ring-nozzles arranged coaxially of the tube-outlet one behind the other in the direction of flow of the fluid for the delivery of heated gas, in directions pointing obliquely from above on to the descending metered portions. The streams of gas issuing from the ring-nozzles and exerting their keenest effect on passing the tube-outlet, provide an additional working force assisting separation of the single portions from the tube-outlet.

In a method according to the invention, the gas dosed into the fluid, and the gas supplied through the ring-nozzles when used, is usually air, but if one is concerned with particularly sensitive fluids, nitrogen or carbon-dioxide, for example, may be used.

The invention also provides a fluid metering and dispensing device comprising a vertically disposed tube through which a fluid may be progressed, an outlet to the tube through which the fluid may be dispensed, means for progressing a column of fluid down the tube through the outlet at a desired rate, and means for injecting successive portions of gas into the tube to form bubbles spaced along the length of the fluid column in such a manner that the fluid is dispensed from the outlet of the tube in metered portions.

As hereinbefore referred to, one preferred application of a method according to the invention, lies in the treatment of permanently-tacky hot-melt adhesives. Many materials intended for use as permanently-tacky hot-melt adhesive are inherently deformable under comparatively light pressure at room temperature when handled in bulk form, and do not behave as shape-retaining solids. It has been found that by use of a method according to the invention one can provide coated particles of permanently-tacky hot-melt adhesives which can be stored for useful periods of time without agglomeration of the particles or other unwanted adherence, and which are readily handleable by the processor.

The method of the invention may be operated to form a particle of permanently-tacky melt-adhesive comprising a drop of adhesive composition encased in a closed coating of thermoplastic material, and by a layer of powder surrounding the said closed coating.

In such a particle, the powder material is preferably one such as blends with the melt-adhesive, and does not itself possess self-adhering properties. Suitably, the powder softens at a temperature below the melt temperature of the adhesive, and moreover the powder must be insoluble in the melt-adhesive, as otherwise it would in time migrate into the melt-adhesive whereby this could redevelop its adhesive properties at the surface of the particles.

For the further processing of such particles, at the time of their use to provide a pressure sensitive adhesive coating, the particles are melted, whereby the powder and the coating derived from the powder material mix with the melt-adhesive. In order that the coating and the powder material do not impair the properties of the adhesive coating, one preferably chooses a powder material which provides a component of the adhesive, and preferably the quantity of this component is so chosen in relation to the quantity of material enclosed by the coating that after the melting of the powdered grains there is in the resulting mixture exactly the correct amount of the relevant component.

In order that the above and others of the various aspects and several features of the invention may be more fully understood, there now follows a detailed description (to be read with the accompanying drawings) of the three illustrative devices, of two example methods which are also illustrative of the invention, and of example particles which may be prepared by the method of the invention. It will of course be understood that these illustrative devices, illustrative methods and illustrative particles, have been selected for description to illustrate the invention by way of example only.

Figure 1:
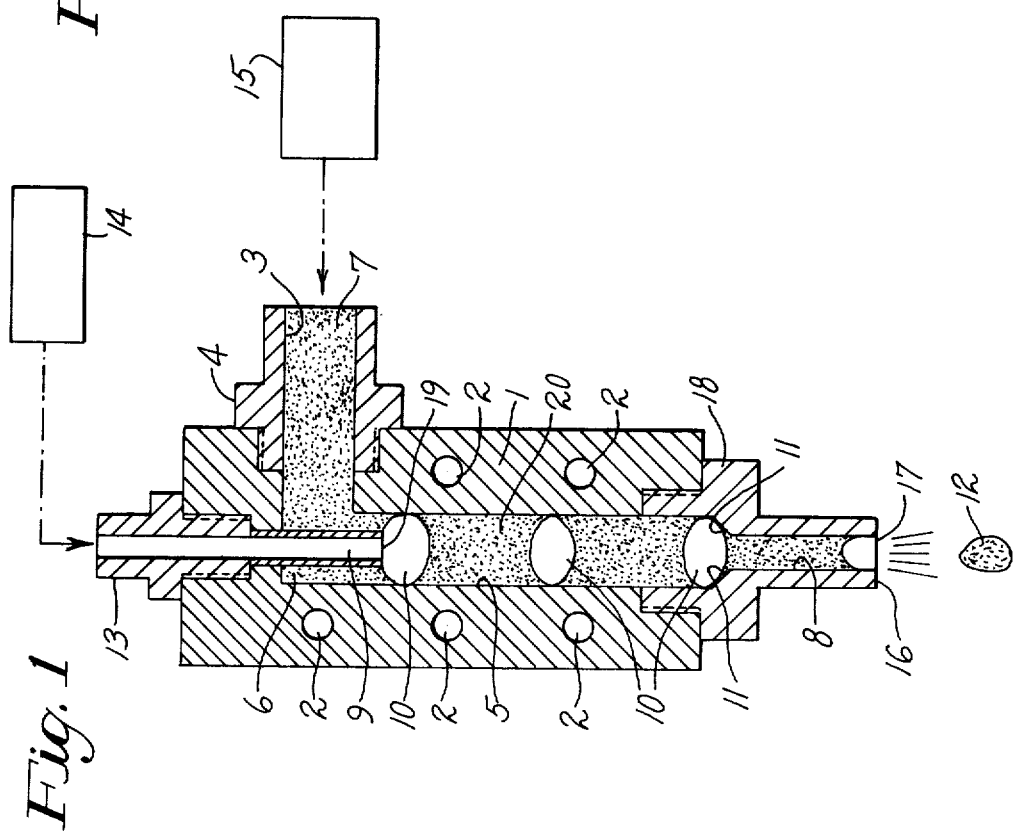
FIG. 1 is a vertical, sectional, diagrammatic view of the first illustrative device.

The first illustrative device, shown in FIG. 1, has a block 1 with conduits 2 for the through-flow of a heating medium so that the block 1 can, if desired, be heated. This is necessary if the liquid to be divided is a hot melt. Into the block 1, from the side, is screwed a nipple 4, the bore 3 of which merges into an elbow 6 of the block 1, which is of the same diameter. The elbow 6 continues on the other side in a vertically disposed tube 5 inside the block 1. The tube 5 has at its outlet a nipple 18, the upper boring of which has the same diameter as the tube 5. The nipple 18 has a zone 8 of reduced diameter, commencing at shoulder narrowing 11, as compared with the diameter of the tube 5. The zone 8 is arranged coaxially with the tube 5.

The block 1 is also provided with a nipple 13, which carries a nozzle 9 extending in the elbow 6 to a distance which brings its nozzle-end 19 below the elbow 6, so that the nozzle-end 19 is completely surrounded by the tube 5. The nozzle 9 is arranged coaxially to the tube 5, which runs vertically, and the flow-direction inside the tube 5 proceeds from above downwards.

A liquid 7 that is to be divided is fed through the bore 3 of the nipple 4, arriving then at the elbow 6, where it completely surrounds the nozzle 9. From the nozzle 9 the liquid 7 then flows downwards and finally issues from the bottom-end of the nipple 18. During this passage through the tube 5, gas-bubbles 10 are injected seriatim at required frequency via the nipple 13 and nozzle 9 into the tube 5. The flowing fluid 7 is dispensed from the outlet at the bottom end of nipple 18 as metered quantities, of a size determined by the rate of flow of the fluid and the frequency of the gas-bubbles 10. The separation of the fluid 7 into metered quantities is effected by the gas-bubbles 10, which, by reason of their pressure, immediately upon entry into the tube 5 extend symmetrically outwards towards the inner walls of the tube 5 substantially to fill a cross section of the tube. The gas-bubbles 10 progress down the tube 5, spaced apart by portions 20 of uniform desired quantities of the flowing fluid 7 between them. Thus, each gas-bubble 10 progresses with the stream of liquid 7, moving downwards, to the position of the gas-bubble 10 shown at the entrance to the zone 8 in the nipple 18. From here, as a consequence of the narrowing commencing at the shoulder 11, the liquid 7 flows correspondingly quicker until the gas-bubble emerges at the outlet at the bottom-end of the nipple 18. Here, the gas-bubble pushes before it a portion 20 of the liquid to form a drop 12 which then falls freely.

A dosing device 14 for the delivery of the gas-bubbles 10 and a pump 15 for the supply of the liquid 7 that is to be divided are indicated diagrammatically. The dosing device 14 is of a design such that it permits adjustment at choice of the gas-pressure, of the quantity of gas at any particular time, and of the frequency of release of the gas-bubbles. Also, the pump 15 is of a design such that its delivery rate may be controlled.

In the first illustrative device, the pump 15 is a geared pump. The pump sucks out of a storage container (not shown) liquid, for example melt-adhesive at a temperature of 160°C., compresses it and feeds it under pressure through a heated pipe-conduit of ½ inch diameter into the bore 3 of the nipple 4. The geared pump, when operated at 80 r.p.m. feeds 4.8 kg of liquid per minute. This quantity of liquid is suitably distributed in equal parts to 10 of the first illustrative devices. Each of these devices has a dosing device 14 which is fitted with an electro-magnetically activated pneumatic valve and connected to an air-supply conduit which is fed by a compressor (the valve, conduit and compressor not being shown). An electric program-control (not shown) may be used to control the pneumatic valve. The program-control can consist, for example, of a rotatably-mounted shaft on which 10 cam-discs are mounted. The shaft is driven by an electric-motor and may perform 120 r.p.m. in which case each cam-disc activates a micro-switch twice in a second, so that each pneumatic valve is opened and closed twice per second. This means that each valve injects two air-bubbles 10 per second into the flow of liquid 20.

In using the first illustrative device to produce the illustrative particles by the first illustrative method, a pressure sensitive hot-melt adhesive is charged to the storage container, melted and fed by the pump 15 through the bore 3 to the tube 5. The adhesive is of the following formulation:

20 weight-percent hydrocarbon resin (melting-point 100° to 120°C.)

20 weight-percent polybutene (molecular weight 2000)

20 weight-percent mineral oil (density 0.9g per cm$^3$)

30 weight-percent thermoplastic block copolymer of butadiene-styrene 9 weight-percent polyethylene (melt index 20)

The adhesive is fed at a temperature of 160°C. and 1.7 standard atmospheres pressure, and two bubbles of air 10 per second are delivered at a pressure of 2 atmospheres pressure at the nozzle-end 19. In this way two drops 12 of adhesive of about 4 grams weight are delivered per second at an outer edge 17 of the nipple 18. Although these values are employed in this first illustrative method, it will be understood that the size of drops produced may be varied by control of the pressure of the injected gas in relation to the viscosity and rate of flow of the liquid. For example, with melt-adhesives fed under 1.7 standard atmospheres pressure, in the case of a melt-adhesive of 1200 centipoise at 130°C. at a gas-pressure of 1.4 standard atmospheres, five portions of adhesive of 3 grams each may be delivered from the nipple 18 in 0.6 seconds, or with a melt-adhesive of 12,000 centipoise at 140°C., at a gas-pressure of 2.5 standard atmospheres, five portions of adhesive of 3 grams each may be delivered from the nipple 18 in 0.6 seconds.

Figure 4:
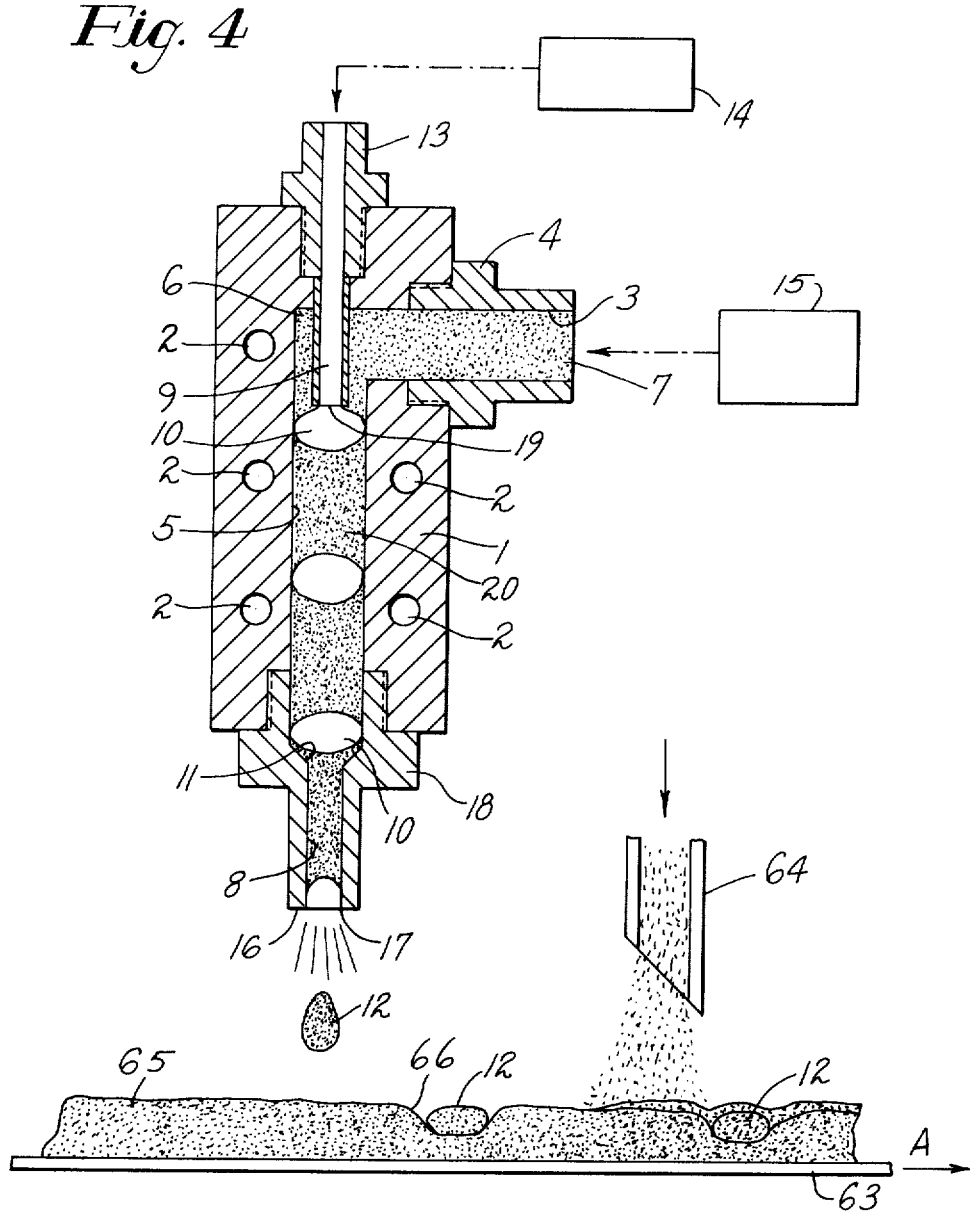
FIG. 4 is a vertical, sectional, diagrammatic view showing the first illustrative device in conjunction with a powder applying means.

In carrying out the first illustrative method, a conveyor arrangement is employed as shown in FIG. 4, comprising a conveyor belt 63, and a dusting nozzle 64. A layer 65 of polyethylene powder (melt index 20) is carried on the conveyor belt 63.

The drops 12, of the melt-adhesive fall from the nipple 18 into the powder-layer 65 carried by the conveyor-belt 63, and solidify. They are first covered by powder-grains on their underside, and a small crater 66 forms in the powder-layer 65 in respect of each drop. In order now that the drops 12 may be also powdered on their upper side, the dusting-nozzle 64 is provided in which powder-grains are transported either by means of an air-stream or in free fall, and are deposited upon the drops 12 lying in the craters 66, thus forming a powder-layer on the upper side of the drops 12 so that the latter are completely enveloped by powder. The powder serves the purpose of minimizing the self-adhesive effect at the surface of the drops, as otherwise they would adhere to each other on being heaped together. The powder used in the first illustrative method is a thermoplastic material whose melting-point is lower than the temperature of the drops 12 falling into the powder-layer 65, so that a thin coating of powder-grains is melted on to the drops 12. The material of the powder is also not soluble in the material of the melt-adhesive, so the powder does not disappear in the course of time into the drop of melt-adhesive.

The conveyor-belt 63 moves continuously in the direction indicated by the arrow A shown in FIG. 4, and after passing beneath the dusting-nozzle 64 it delivers drops 12 of melt-adhesive completely covered with powder into a sieve-like container (not shown) where the superfluous powder and the coated drops 12 are separated from each other.

In the first illustrative method the powder used has the following sieve analysis:

Approximately 50 weight-percent between 200 and 315 microns

Approximately 20 weight-percent between 160 and 200 microns

Approximately 23 weight-percent between 80 and 160 microns

Approximately 5 weight-percent under 80 microns

Approximately 2 weight-percent under 315 microns

Figure 5:
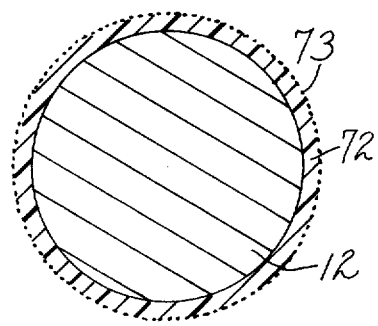
FIG. 5 is a sectional view of an illustrative particle.

On the melting of this powder material on to a drop 12 falling into the powder layer, a thin sheath of material melted from the powder is formed which completely surrounds the drop. To this sheath there further adheres a layer of single powder-grains insofar as these are just melted on their side nearest to the drop. Thus, the illustrative particles (FIG. 5) so produced contain the drop of permanently-tacky melt-adhesive 12, which is surrounded by a coating 72 of melted powder material, upon which coating there also lies a melted-on layer 73 of powder grains. In these illustrative particles, the coating of melted powder and the melted-on powder grains contribute approximately 1 percent by weight to the composition of the particles, and provide an ingredient of the permanently-tacky hot-melt adhesive.

In the illustrative particle (FIG. 5) the enclosing sheath 72 provides a tough, flexible coating which not only prevents the powder migrating into the drop of adhesive, but also serves to assist storage ability of the particles. It has been found that a 25 kilogram pack of these particles can be stored for more than half a year at ambient temperatures up to 40°C. without the melt adhesive enclosed by the coating exuding to agglomerate the particles to an undesirable extent.

In carrying out the first illustrative method using this illustrative device, the single gas-bubbles 10 are injected via the nozzle 9 into the flowing liquid 7 under such pressure that a sudden expansion of the gas-bubbles occurs in each case at the bottom end of the nipple 18. This expansion is represented in FIG. 1 by the diverging lines. With this expansion, the liquid drop pushed forward in front of the relevant gas-bubble is cleanly detached from the inner-edge 17 of the bottom-end of the nipple 18. This is of special significance when the liquid to be divided is a very viscous one, for example, a melted hot-melt adhesive which has an especially strong tendency to draw into filaments. The shearing effect at the edge 17 of the first illustrative device is here intensified by its being constructed as a sharp edge, in that the bottom end of the nipple 18 is ground to a flat surface 16 normal to the axis of the nipple 18. On the one hand, one thus obtains the especially sharp edge 17, while on the other hand the under end of the nipple 18 remains relatively compact and is thus largely safe from damage from impacts.

Figure 2:
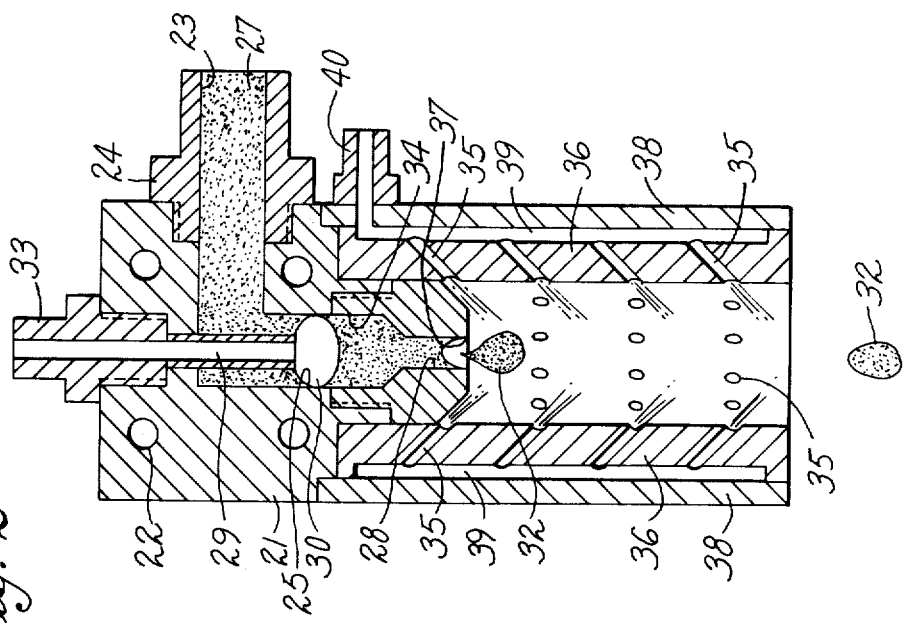
FIG. 2 is a vertical, sectional, diagrammatic view of the second illustrative device.

The second illustrative device, represented in FIG. 2, is similar in many respects to the first illustrative device, parts numbered 21,22,23,24,29,33, and the nipple 34 providing a zone 28 of reduced diameter, being constructed and arranged in the same way as the block 1, conduits 2, bore 3, nipple 4, nozzle 9, nipple 13, nipple 18, and zone 8 respectively, of the first ilustrative device. As in the first illustrative device, fluid 27 may be fed into the bore 23 from a pump and thus into a vertically disposed tube 25. Gas-bubbles 30 are introduced to the tube from a dosing device (not shown) and the fluid is thus metered as in the first illustrative device. The second illustrative device also has means for heating discharged portions, comprising a coaxial arrangement of nozzles 35 arranged somewhat in the form of a ring around the outlet 37 of the nipple 34. Heated gas is directed through the nozzles 35 upon drops 32 of liquid detaching themselves from the nipple outlet 37. The nozzles 35 run obliquely from above in the direction of the path of fall of the drops 32 so that these are sheared off particularly forcibly from the tube-outlet 37, minimizing filament formation even with especially viscous liquids. The nozzles 35 are provided in a nozzle-body 36 which extends inside a housing 38 secured to the block 21. The nozzle-body 36 and the housing 38 are spaced to form an intermediate chamber 39 surrounding the nozzle body 36, into which chamber the heated gas is fed via a nipple 40 for supply through the coaxial nozzles 35. It will be apparent that this second illustrative device may be employed to meter and dispense drops of hot-melt-adhesive into a supply of thermoplastic powder material by a method similar to the first illustrative method.

Figure 3:
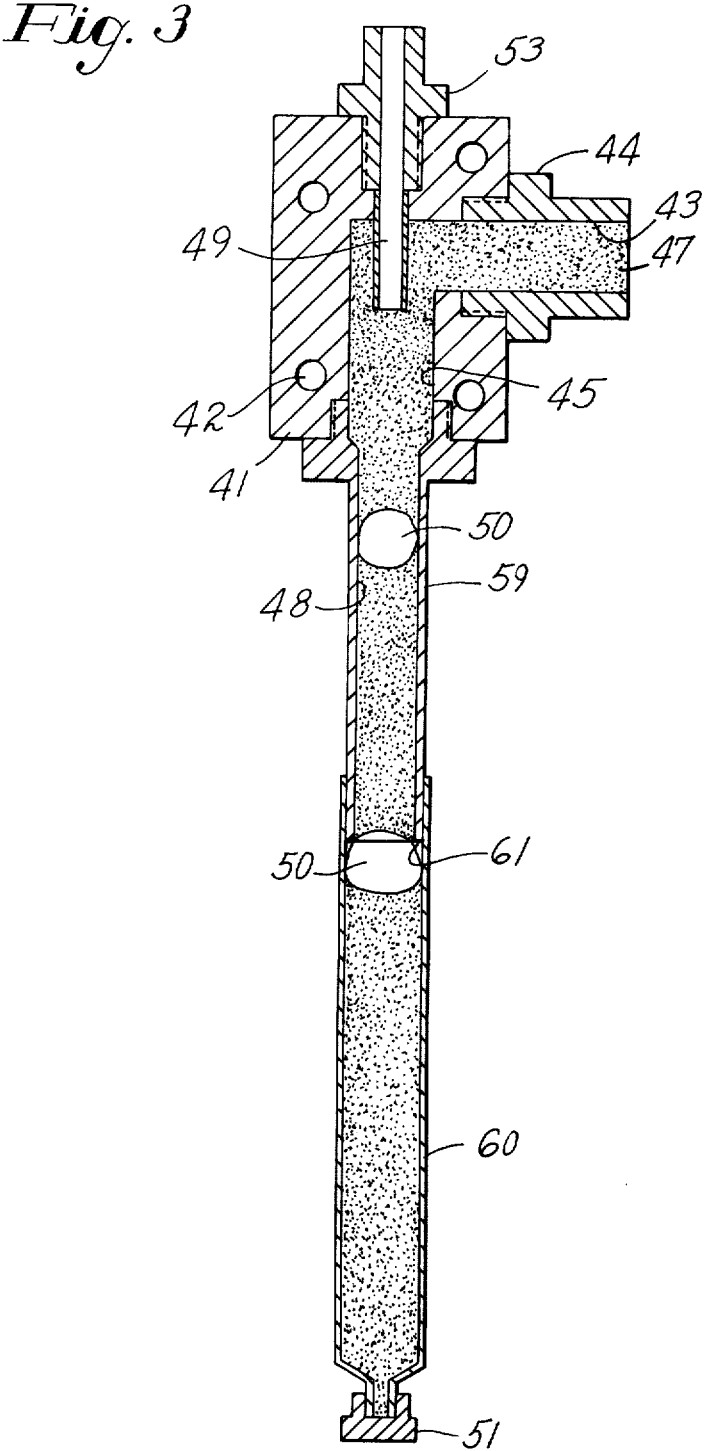
FIG. 3 is a vertical, sectional, diagrammatic view of the third illustrative device.

The third illustrative device, shown in FIG. 3, is primarily intended for filling tubes. The device is similar in many respects to the first illustrative device, the parts numbered 41,42,43,44,49,53, being constructed and arranged in similar fashion to the block 1, conduits 2, bore 3, nipple 4, nozzle 9 and nipple 13 respectively of the first illustrative device. In the third illustrative device fluid from tube 45 in the block 41 passes to a pipe 59 instead of the nipple 18 used in the first illustrative device. The pipe 59 includs a zone 48 of reduced diameter as compared with the diameter of the vertically disposed tube 45. In the illustrative method of filling tubes with fluid, e.g. tooth-paste, at the start of a tube filling operation, a tube 60 is drawn completely over the pipe 59, whereby its screw-cap closure 51 is up against an outlet end 61 of the pipe 59. When fluid 7 to be metered and dispensed is forced into the pipe 59, it arrives inside the tube 60 and pushes this down, according to the rate of filling from the pipe 59. Gas-bubbles 50 are dispensed seriatim from the nozzle 49 so that when the tube 60 is filling, gas-bubbles 50 emerging from the nozzle 49 serve to divide the liquid 47 and are introduced at a pressure and frequency such that when the tube 60 is sufficiently filled, a gas-bubble 50 reaching the end 61 of the pipe 59 urges the filled tube 60 away from the tube 59.

When using the first and second ilustrative devices, the dispensed portions 12 and 26 may be allowed to fall freely into the air which thereby provides a conserving medium, since, for example, by cooling the portions it ensures that they retain their size. In the third illustrative device, however, the tube 30 serves as the conserving medium, i.e. a container exactly as large as a portion.

Having thus described our invention what we claim as new and desire to secure as Letters Patent of the United States is:

1. A method of metering and dispensing fluids which comprises progressing at a substantially constant rate a column of the fluid through a tube, injecting at timed intervals successive portions of gas seriatim into successive portions of said column of fluid to form bubbles spaced along the length of said columm so that fluid flows from an outlet opening of the tube as separated portions of uniform magnitude determined by said rate and said intervals.

2. A method of metering and dispensing fluids as defined in claim 1 in which said bubbles emerging from said outlet opening urge said portions of fluid away from said outlet openings and said portions are collected in a medium for preserving the separateness of said portions.

3. A method of metering and dispensing fluids as defined in claim 2 in which said portions of gas are injected centrally of said column and in volume and at a pressure to extend substantially symmetrically outward toward the walls of said tube.

4. A method of metering and dispensing fluids according to claim 3 wherein the conserving medium is a single portion container.

5. A method of metering and dispensing fluids according to claim 4 wherein the fluid is a paste and in which said container has an open end and a closed end, said container is drawn over said tube with the outlet opening of said tube adjacent the closed end of said container, said fluid paste is forced into said container and pushes said closed end down, said gas-bubbles are spaced to form fluid paste portions having the volume desired in said container, and said bubbles emerging from said outlet opening urging filled containers away from said outlet opening.

6. A method of metering and dispensing fluids according to claim 1 wherein the fluid is a melted thermoplastic substance, and the gas is injected in heated state.

7. A method of metering and dispensing fluids according to claim 6 wherein the fluid is a melted pressure sensitive hot melt adhesive.

8. A method of metering and dispensing fluids according to claim 1 wherein the tube is vertically disposed and the fluid is progressed downwardly through the tube by means of a pump, the output of which can be varied to vary the rate of flow of the fluid through the tube.

9. A method of metering and dispensing fluids according to claim 1 wherein the gas-bubbles are supplied from a dosing device capable of delivering gas-bubbles at a desired pressure and volume, and at a selected frequency.

10. A device for metering and dispensing fluids comprising a tube through which a fluid is progressed, an outlet at the end of the tube through which the fluid may be dispensed, means for progressing a column of fluid through the tube to establish a substantially constant rate of flow to the outlet and means for injecting at timed intervals successive portions of gas into the tube to form bubbles spaced along the length of said column to separate the fluid dispensed from the outlet of the tube into metered portions determined by said rate and said intervals.

11. A device for metering and dispensing fluids according to claim 10 comprising means for selectively controlling the frequency of injection of the gas to control the spacing of said bubbles.

12. A device for metering and dispensing fluids according to claim 11 comprising means for selectively controlling the volume and pressure of injection of the gas to form bubbles extending substantially to fill a cross section of said tube.

13. A device for metering and dispensing fluids according to claim 12 comprising an injector nozzle located coaxially within the tube, through which the gas-bubbles are injected.

14. A device for metering and dispensing fluids according to claim 13 wherein the outlet to the tube comprises a nozzle portion of reduced bore as compared with the bore of the tube.

15. A device for metering and dispensing fluids according to claim 14 wherein the outlet to the tube is formed with a sharp inner edge arranged at right angles to the tube axis.

16. A device for metering and dispensing fluids according to claim 13 comprising at least one group of annularly arranged nozzles disposed coaxially around the tube-outlet, for the feed of gas obliquely downwards into the path of metered portions of fluid passing from the tube-outlet.

* * * * *